United States Patent [19]

Gover, Sr.

[11] 4,176,990
[45] Dec. 4, 1979

[54] BORING TOOL

[76] Inventor: Russell D. Gover, Sr., 97 Wise Ave., Baltimore, Md. 21212

[21] Appl. No.: 896,483

[22] Filed: Apr. 14, 1978

[51] Int. Cl.² .................... B23B 51/00; B23B 29/034
[52] U.S. Cl. ................................. 408/189; 408/223
[58] Field of Search ............... 408/223, 224, 225, 227, 408/228, 206, 189, 199

[56] References Cited

U.S. PATENT DOCUMENTS

| 918,003 | 4/1909 | Campbell | 408/227 X |
| 3,548,687 | 12/1970 | Holloway | 408/206 |
| 3,572,183 | 3/1971 | Mellone | 408/227 X |
| 3,765,789 | 10/1973 | Hougen | 408/223 |

FOREIGN PATENT DOCUMENTS 2358048  5/1975  Fed. Rep. of Germany ........... 408/223

Primary Examiner—Gil Weidenfeld
Attorney, Agent, or Firm—John F. McClellan, Sr.

[57] ABSTRACT

A boring tool having asymmetric disposition of cutting edges providing smooth, balanced cutting permitting the use of a lighter tool for a given job and having proportions providing a range of lateral adjustment for increasing hole size when desired while preserving smooth cutting characteristics; in simplest embodiment the tool comprises a unitary, substantially rectangular shape block for mounting a pilot bar with a cutting edge on each side of the axis, one cutting edge being closer to the axis and being longer than the other, the two cutting edges located for making contiguous cuts; on one side a relieved portion adjacent one cutting edge (on the outboard end of the inboard cutting edge) automatically engages the work when positioned more inboard as result of lateral resetting of the tool to bore a larger hole than the holesize for which nominally designed.

7 Claims, 6 Drawing Figures

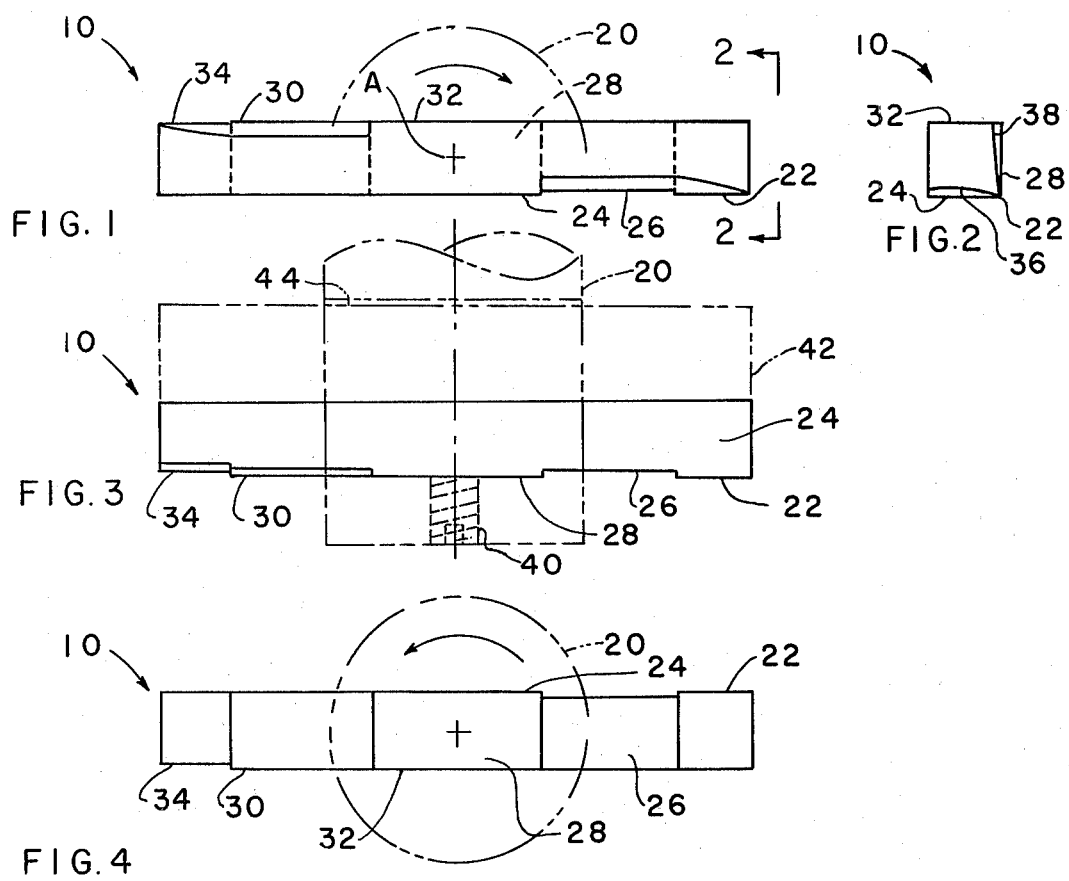

BORING TOOL

This invention relates generally to machine tool elements and specifically to spot-face and hole boring tools for working steel and brass and the like.

A principle object of the invention is to provide an improved boring (or spot facing) tool which employs cutting edges on differing center spacings to make contiguous cuts in work being bored and which can be set to produce surprisingly smooth, balanced-cutting of bored holes of any desired diameter within a limited range of adjustment.

Further objects are to provide a surprisingly durable, unitary tool of the type described, of lowest possible cost to manufacture, which is easy to use and to sharpen, which can be supplied in sizes to suit almost any conceivable need, which can be made shorter along the axis so that it requires less tool steel than perhaps any tool capable of the same work, and which is safe and works faster and with a heavier cut than known equivalent-size tools for the same work. Optionally a full depth cutter can be used for heaviest work in place of a smaller depth cutter with backup, the standard pilot bar accommodating either, as desired, in the customary 1¼ inch tool-holding slot.

Still a further object is to provide, in a boring tool rotatable about an axis of rotation by a pilot bar normal thereto, the boring bar having a flat bottom with outboard and inboard cutting edges generally opposed on respective ends of the boring tool, said cutting edges located respectively on first and second center distances for cutting respectively contiguous paths in work to be bored, the improvement comprising: the inboard cutting edge having outboard thereof a relief portion cutting edge, the boring tool having proportion for being reset in a direction placing the outboard cutting edge farther outboard relative to said axis of rotation, the relief portion cutting edge having axial clearance proportioned relative to the inboard and outboard cutting edges for engaging work and cutting a path substantially contiguous to said respectively contiguous paths when the boring tool is reset.

In the prior art disclosures of tools for boring and spot facing include the following:

U.S. Pat. No. 3,572,183 to G. Mellone, March 23, 1971, discloses a straight drill with cutting faces at different radial distances from the axis (FIG. 3) so that edge 17 cuts a path close to the axis, edge 19 cuts a path just bordering the first path on the outboard side and similarly edge 21 cuts a path bordering that of edge 19 on the outboard side.

U.S. Pat. No. 2,835,293 to B. A. Mackey, May 20, 1958, discloses a boring tool (for wood), a continuous cutting edge on one side and a discontinuous cutting edge on the other.

West German Pat. No. 2,358,048, May 22, 1975, discloses a drill with a cutting edge close to the axis on one side, and opposite that a cutting edge spaced from the axis on the same diameter. An English language abstract attached to the copy in the Examiner's files sets out the following:

"Bundesrepublik Dutch. May 79 W. Germany, Anneld 21.11.73, Off 22.5.75, Geber Heller, March 21.

Two edged drill for high tensile materials has cutter plate whose edges are axially and positively radially between zero and five degrees. The front cutting edge is on or near the drill periphery and the main cutting edges are inclined inwards where the total cutting width is so split on the two cutting edges that one edge assumes roughly the outer half of the cutting width and the drill guide and the other cutting edge assumes roughly the inner half of the cutting width. The rake angle of the cutter plate edges is coaxially and radially positive in a range between 0° and 5° and the inner cutting edge lies at least 0.1 to 0.3 mm below the centre of the drill axis. The drill has internal cooling and lubrication bores which emerge in the free faces near the flutes." It is noted in relation to this disclosure that although the two cutting edges are on different radii, they cut substantially the same width paths in the work, in contrast with applicant's invention, and also in contrast, have adjacent reliefs of approximately equal width.

In addition, both spade-bottom and flat-bottom straight rotatable boring "blades" having plural grooves on each of the two cutting edges in offset locations are known to be made and advertised for sale by the Waukesha Cutting Tools, Inc., 1111 Sentry Drive, Waukesha, Wisc. 53186.

However, it is believed that the objects of the present invention can not be fulfilled by these or any other prior art devices known.

In brief summary given for cursive description only and not as limitation the invention includes chatter-reducing rotatable boring tool having a pair of unequal cutting edges respectively on unequal spacings and on opposite ends, larger edge on smaller spacing, producing adjacent cutting paths, and further in an embodiment a relief located adjacent one such cutting edge in position serving as an extension of the cutting edge when the boring bar is set to bore larger than normal size holes.

The above and other objects and advantages of this invention will become more readily understood from examination of the following description, including the drawings, in which like reference numerals refer to like parts:

FIG. 1 is a top plan view of the tool of this invention;

FIG. 2 is an end view taken at 2—2, FIG. 1;

FIG. 3 is a side elevational view thereof, mounted with a backup piece in a pilot bar (phantom lines);

FIG. 4 is a bottom plan view with pilot bar indicated in phantom lines;

STRUCTURE

Figure 5:
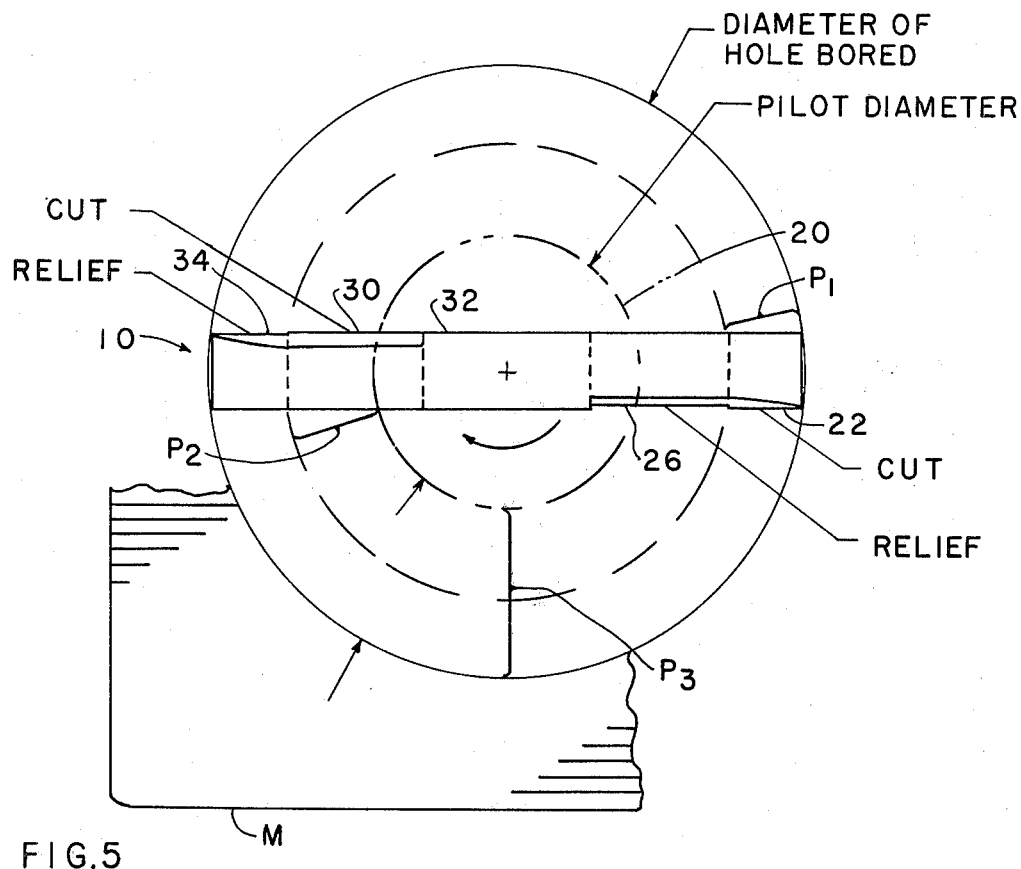
FIG. 5 is a top plan view diagram of relation of the tool of this invention to hole in work being bored with tool-length centered.

FIGS. 1 through 4 show a typical embodiment of the invention in the form of boring cutter or tool 10, a generally square-section, straight rectangular bar of tool steel. Conventional pilot bar 20 mounts the tool adjustably, along the suitably proportioned tool length, about the axis-of-rotation A of the pilot bar; direction of rotation is indicated by the curved arrow.

The cutting edges are as follows; it will be noted that they are not co-aligned on a diameter, but instead are substantially parallel-offset by the width of the boring tool; this may be a contributing factor added to the combination of unequal cutting lengths and dispositions, to provide the surprising performance of this invention.

Outboard cutting edge 22 extends inward from one end along the bottom edge of one face 24; this cutting edge stops at the inner end at a center distance, or distance along the face from the transverse plane of the axis of rotation, fixed by a relatively deep bottom relief 26 extending inwardly from the outboard cutting edge to the central bottom part of the tool which is a full-section clamping flat 28 within the pilot area. Inboard cutting edge 30 extends from the clamping flat outwardly along the bottom edge of the opposite face 32, on the opposite end of the tool a center distance or distance along the face equal to the outboard relief, that is to the center distance or distance along the face to the inner end of the outboard cutting edge, so that in operation the outboard and the inboard cutting paths in the work are contiguous. Relief portion cutting edge 34 is essentially a continuation of the inboard cutting edge in outboard direction to the end of the tool, except that it has sufficient axial relief relative to the other two cutting edges to prevent it from engaging the work in the cutting paths of either of the other two cutting edges.

It will be noted that the relief adjacent the outboard cutting edge never engages the work in any adjustment, that in the centered position the reliefs are in direct proportion to the opposite cutting edges, and further, that running with the tool centered the two cutting edges add up to one-half the exposed tool length.

As a guide to the principle of this invention in preferred embodiment, the inboard cutting edge may be proportioned to cut a path approximately one-fifth wider than the outboard cutting edge, being, as said, equal in length to the relief on the inboard side of the outboard cutting edge when the tool is running centered.

The cutting edge faces are hollow-ground as at 36 shown in FIG. 2, deeper at the top, and shallower at the ends for chip breaking according to convention chip breaking practice. All cutting edges have trailing clearance as at 38 in the second Figure.

Clamping to the pilot bar may be, as shown in FIG. 3, by any conventional means such as by a screw 40 threaded up through the pilot bar lower end and pressing the tool upward against a backing piece 42 and the backing piece in turn against the top of pilot bar recess 44, FIG. 3.

Because of the low-stress operation provided by the asymmetrical dispostion of the cutting edges, both when the tool is symmetrically disposed and when set over for larger hole cutting, a separate mild steel or brass backing piece such as that shown can be used, eliminating need for a full depth, massive tool, providing great economy.

FIG. 5 shows relations of the cutting edges 22 and 30 in cutting adjacent paths $P_1$ and $P_2$ in a piece of metal M (shown fragmentarily) being worked, making up full width path cut $P_3$.

Figure 6:
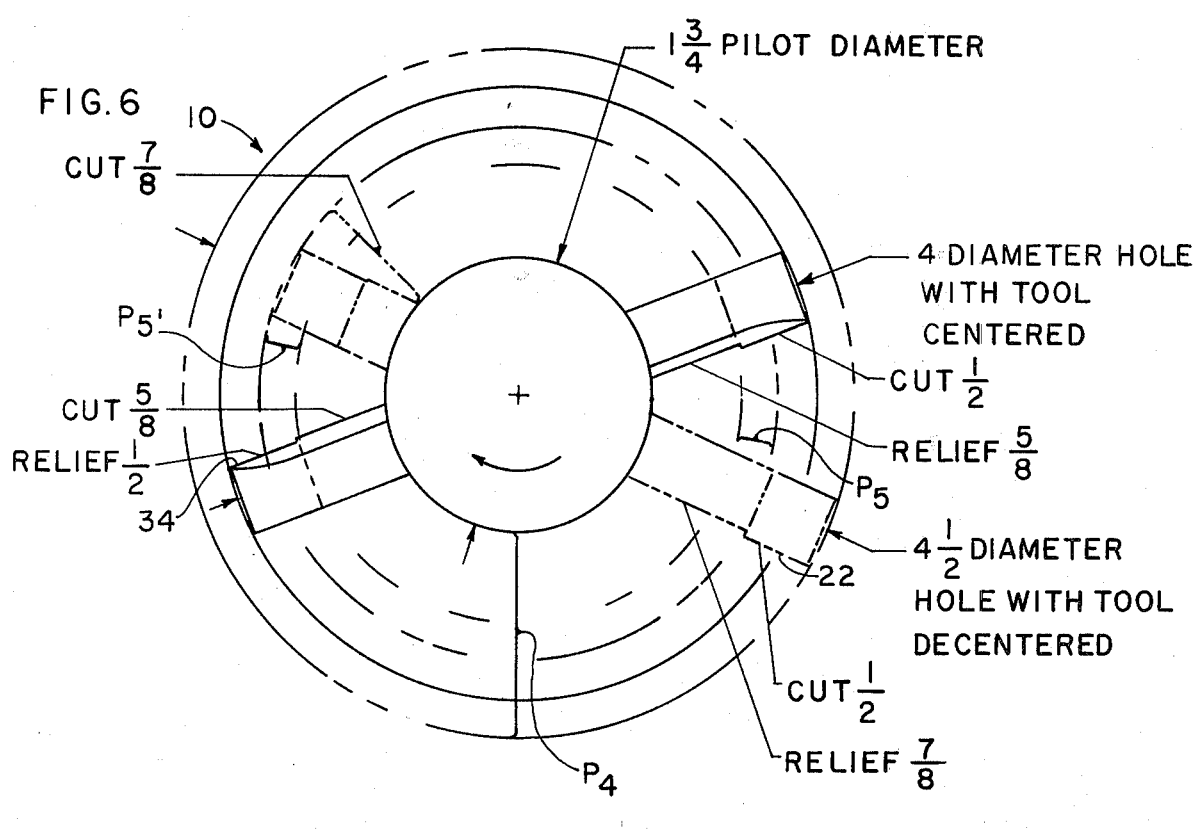
FIG. 6 is a top plan view diagram similar to the previous Figure but contrasting the relation of the tool of this invention to hole in work being bored with tool-length centered and with tool-length decentered.

FIG. 6 shows how a full-width cutting path $P_4$ is maintained in material bored when the boring tool is set over in-plane or adjusted to a position with the outboard cutting edge end of the tool having an even greater center distance or distance along the face than the inboard cutting edge end of the tool. The work path missed at $P_5$ by the outboard cutting edge 22 as result of such adjustment to bore larger holes, is cut at $P_5'$ by the recessed portion cutting edge 34. The slight recess step is so nearly in the plane of the flat bottom that in boring it is not the cause of any noticeable chatter and since inboard of and axially behind the outboard cutting edges, it finds no plug at the bottom of a hole bored.

Dimensions appearing in the last Figure are merely exemplary of proportion in the usual machine shop range, but may be taken as in inches.

The principle of longer, stronger cutting edge being on shorter center distance can be followed with good results at other proportional settings.

Following this disclosure one skilled in the art can easily adapt the tool in sizes for boring other size holes in analogous-metal working, setting rotational speeds as high as possible without breaking. 75 RPM was used in this example, the same speed at which conventional tools broke in the same work. To summarize this aspect, in a typical application, the example given, boring four-inch diameter holes in six-inch thick hot rolled steel, in preferable embodiment the tool may be four inches long by one-half inch in width and in height. On the outboard end, the cutting edge may be one-half inch long, the relief portion may be five-eights inch long; on the inboard end the cutting edge may be five-eights inch long, and the relief portion cutting edge length may be one-half inch long and relief may be five one-thousandths inch, the pilot bar may be one and three-fourth inches in diameter, the clamping flat may be about one and one-eighth inches long and centered. The outboard cutting edge may be adjustable outboard by one-fourth inch maintaining the one-half inch cutting width outboard but increasing the adjacent relief by one-fourth inch but compensating this by increasing the inboard cutting edge to seven-eights inch, and, in sum, producing a four and one-half inch bored-hole diameter.

Event though the small cutters will somewhere reach breaking limit because of length, as noted, because pilot bars customarily used to date are all slotted for one and one-half inch high tools, the option is open with these to revert to larger cutters to bore even larger holes because the stress has been reduced an estimated 50% by this new design.

In conclusion, although the invention is not completely understood, it will be appreciated that the surprisingly smooth, high speed non-chattering operation is provided by providing a non-resonating balanced relation of the asymmetrical ends of the tool, resistance generated by the longer-radius, shorter, continuous, flat, outboard cutting edge being balanced for quiet, true cutting against the shorter-radius, longer, continuous, flat, inboard cutting edge, extension toward the longer radius side by resetting to bore a larger hole being automatically compensated by engagement of additional length on the inboard cutting edge side. The results were even more surprising in the set-over mode for larger hole boring than when centered, considering the new coaction. It may be that the diameter of the pilot bar in offsetting the inboard cutting edge from dead center by a substantial amount could possibly contribute to the effective cutting provided by the invention, but whatever the cause, the advance of the old art is striking.

This invention is not to be construed as limited to the particular forms disclosed herein, since these are to be regarded as illustrative rather than restrictive. It is, therefore, to be understood that the invention may be practiced within the scope of the claims otherwise than as specifically described.

I claim:

1. In a boring tool rotatable by a holder about an axis of rotation, the boring tool having a substantially flat bottom with an outboard cutting edge and an inboard cutting edge having asymmetrical spacings along a portion of said substantially flat bottom for cutting respectively contiguous paths in work to be bored, the improvement comprising: in combination: the boring tool being elongate transverse to said axis of rotation, the axis of rotation passing through the boring tool between the ends thereof, the outboard cutting edge and the inboard cutting edge being respectively on opposite ends of the boring tool relative to said axis of rotation, the asymmetrical spacing including the outboard cutting edge having greater spacing from said axis of rotation than the inboard cutting edge spacing, and the inboard cutting edge having a length which is greater than the outboard cutting edge length.

2. In a boring tool rotatable about an axis of rotation, the boring tool having a substantially flat bottom with an outboard cutting edge and an inboard cutting edge having asymmetrical spacings along a portion of said substantially flat bottom on respective ends of the boring tool for cutting respectively contiguous paths in work to be bored, the improvement comprising: the asymmetrical spacing including the outboard cutting edge having greater spacing from the axis of rotation than the inboard cutting edge spacing, the inboard cutting edge having a length which is greater than the outboard cutting edge length, the outboard cutting edge having a relief inboard thereof, and the inboard cutting edge having a length substantially equal to the length of said relief.

3. In a boring tool rotatable about an axis of rotation, the boring tool having a substantially flat bottom with an outboard cutting edge and an inboard cutting edge having asymmetrical spacings along a portion of said substantially flat bottom on respective ends of the boring tool for cutting respectively contiguous paths in work to be bored, the improvement comprising: the asymmetrical spacing including the outbord cutting edge having greater spacing from the axis of rotation than the inboard cutting edge spacing, the inboard cutting edge having a length which is greater than the outboard cutting edge length, the boring tool having opposed faces, and the outboard cutting edge and the inboard cutting edge being respectively on said opposed faces in generally parallel-offset relation to each other.

4. In a boring tool as recited in claim 3, the outboard cutting edge having a spacing from said axis of rotation greater than the length of the outboard cutting edge, and the inboard cutting edge having a length substantially equal to said spacing.

5. In a boring tool as recited in claim 1, the inboard cutting edge having outboard thereof a relief portion cutting edge, the boring tool having provision for being reset in a said holder in a direction placing said outboard cutting edge end of the boring tool farther outboard relative to said axis of rotation than said inboard cutting edge end of the boring tool, the relief portion cutting edge having axial-direction clearance therebeneath proportioned relative to the inboard cutting edge and to the outboard cutting edge for engaging work and cutting a path substantially contiguous to said respectively contiguous paths when the boring tool is reset in said direction placing said outboard cutting edge end of the boring tool farther outboard relative to said axis of rotation than said inboard cutting edge end of the boring tool.

6. In a boring tool as recited in claim 1, the outboard cutting edge having a relief inboard thereof, and the inboard cutting edge having a length substantially equal to the length of said relief.

7. In a boring tool as recited in claim 1, the boring tool having opposed faces, and the outboard cutting edge and the inboard cutting edge being respectively on said opposed faces in generally parallel-offset relation to each other.

* * * * *